United States Patent [19]

Chatani

[11] 4,361,980
[45] Dec. 7, 1982

[54] ROLLING TOY AND AXLE ARRANGEMENT

[75] Inventor: Yasushi Chatani, Tokorozawa, Japan

[73] Assignee: Kawada Co., Ltd., Tokyo, Japan

[21] Appl. No.: 361,503

[22] Filed: Mar. 25, 1982

[30] Foreign Application Priority Data

Mar. 26, 1981 [JP] Japan .............................. 56-41508[U]

[51] Int. Cl.³ .................. A63H 17/26; A63H 5/00; B60B 5/00; B60B 35/14
[52] U.S. Cl. ................................... 46/111; 46/17; 46/221; 301/63 PW; 301/126
[58] Field of Search ............... 46/16, 17, 221, 222, 46/223, 201, 23, 26, 111, 112, 202; 301/1, 63 PW, 111, 124 R, 126, 131

[56] References Cited

U.S. PATENT DOCUMENTS

| 2,383,441 | 8/1945 | Beile | 46/223 |
| 2,473,574 | 6/1949 | Davis | 46/111 UX |
| 2,852,887 | 9/1958 | Washington | 46/201 |
| 3,099,895 | 8/1963 | Beebe | 46/161 |
| 3,384,990 | 5/1968 | Romand | 46/202 X |
| 3,955,311 | 5/1976 | Lyons et al. | 46/163 X |
| 4,058,344 | 11/1977 | Dyson | 301/63 PW |
| 4,193,639 | 3/1980 | Pauly et al. | 301/111 X |
| 4,222,181 | 9/1980 | Cummings | 46/201 X |
| 4,246,718 | 1/1981 | Chatani | 46/26 X |

FOREIGN PATENT DOCUMENTS 244776 3/1926 United Kingdom ............... 46/23

Primary Examiner—F. Barry Shay
Attorney, Agent, or Firm—Don B. Finkelstein

[57] ABSTRACT

A rollable toy having a body with axles having rollable members thereon. Each axle has a stepped, resilient, headed male portion and a female portion with which it mates, each portion having an outer socket for receiving a boss on a spherical wheel member. The wheels may be fixedly or removably mounted to the axles and may have loose contents creating a sound when rolled. A face member may be removably mounted on the body.

51 Claims, 10 Drawing Figures

ROLLING TOY AND AXLE ARRANGEMENT

BACKGROUND OF THE INVENTION

1. Field of the Invention

This invention relates to the toy art, and, more particularly, to an improved roll toy of the type mounted on a plurality of wheels, and which may be rolled upon a surface.

2. Description of the Prior Art

Many varieties of rolling type toys for children of all ages have heretofore been utilized. However, as with all toys, it is often desirable to provide an enhancement to the play value of the toy. This is particularly applicable for very small children, that is, those who are in the stage of their development where tactile and auditory stimulation provides increased learning experiences. For example, the tactile and auditory sensation of a rattle is attractive to a certain stage of development of comparatively young babies. As they grow older and their manipulative abilities increase, the toys should find a corresponding increase in manipulative techniques which may be applied thereto.

Therefore, an improved rolling toy, which can provide an increase in the manipulations which may be performed upon it during play, as well as, if desired, an auditory stimulus emanating from the toy during play, has long been desirable.

SUMMARY OF THE INVENTION

Accordingly, it is an object of the present invention to provide an improved toy arrangement.

It is another object of the present invention to provide an improved rolling toy arrangement.

It is yet another object of the present invention to provide an improved rolling toy which allows a greater amount of manipulation to be applied thereto for the enhanced enjoyment of the user.

The above, and other objects of the present invention are provided, in a preferred embodiment thereof, by providing a body member having a plurality of axle accepting apertures therein. The axles, according to the preferred embodiment, are fabricated in two separate portions: a male axle member, and a female axle member. The male and female axle members are insertable in axle accepting apertures of the body member, and the male axle member fits into the female axle member and is retained therein. Coupling portions of the male and female axle member frictionally engage each other for relative rotary motion. The male axle member is retained by a predetermined force within the female axle member.

Both the male and female axle members have bearing portions for engaging the axle accepting aperture in the body member and the axle is capable of rotational movement with respect to the body member. The male axle member and female axle member may rotate unitarily, or, alternatively, the male axle member may rotate in an opposite direction to the female axle member.

Each of the male and female axle members have apertures in their outer ends in which wheel means may be inserted. If desired, the wheel means may be coupled, for example, by bonding or the like, to the male or female axle member in which it is inserted, so that each wheel rotates with the male or female axle member to which it is coupled. Alternatively, if desired, there may be a predetermined frictional fit between the wheel means and its respective axle member to allow relative rotary motion between the axle member and the wheel means. In such an embodiment, the wheel means may be selectively removable from the axle means for independent play therewith.

The wheel means may, if desired, be fabricated to define a cavity in which noisemaking structures, such as, for example, beads or the like, may be inserted. Thus, when moving, the beads or the like provide a sound emanating from the toy during movement thereof. If the wheel means are detachable from the axle, then the wheel means may be utilized separately to provide the same play value as a rattle.

BRIEF DESCRIPTION OF THE DRAWING

The above and other embodiments of the present invention are more fully understood from the following detailed description taken together with the accompanying drawing, wherein similar reference characters refer to similar elements throughout and in which.

DESCRIPTION OF THE PREFERRED EMBODIMENTS

Figure 1:
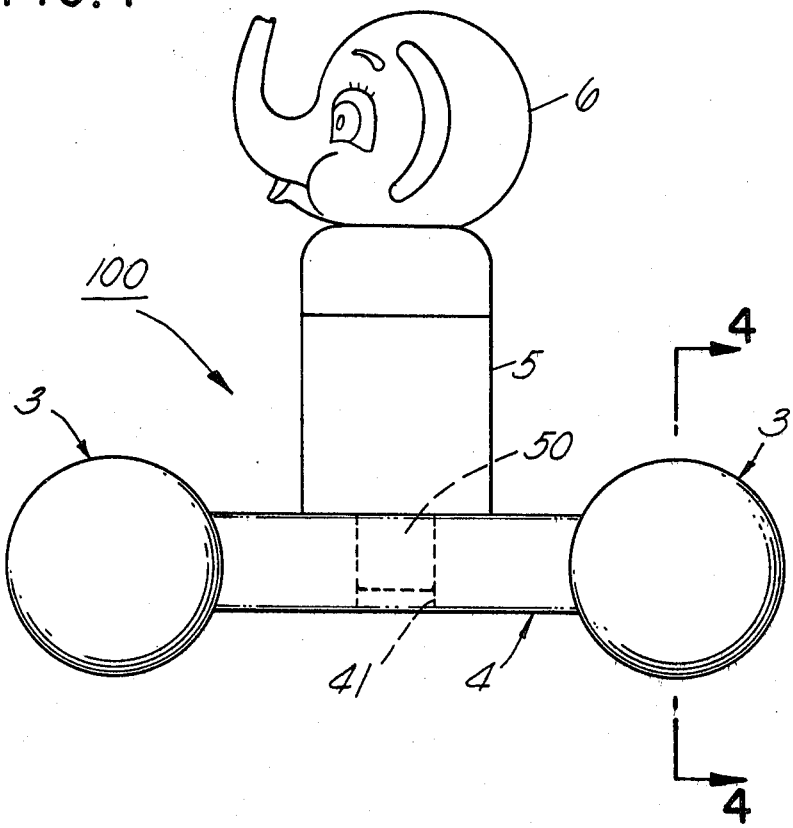
FIG. 1 is a side elevational view of one embodiment of the present invention.
Figure 2:
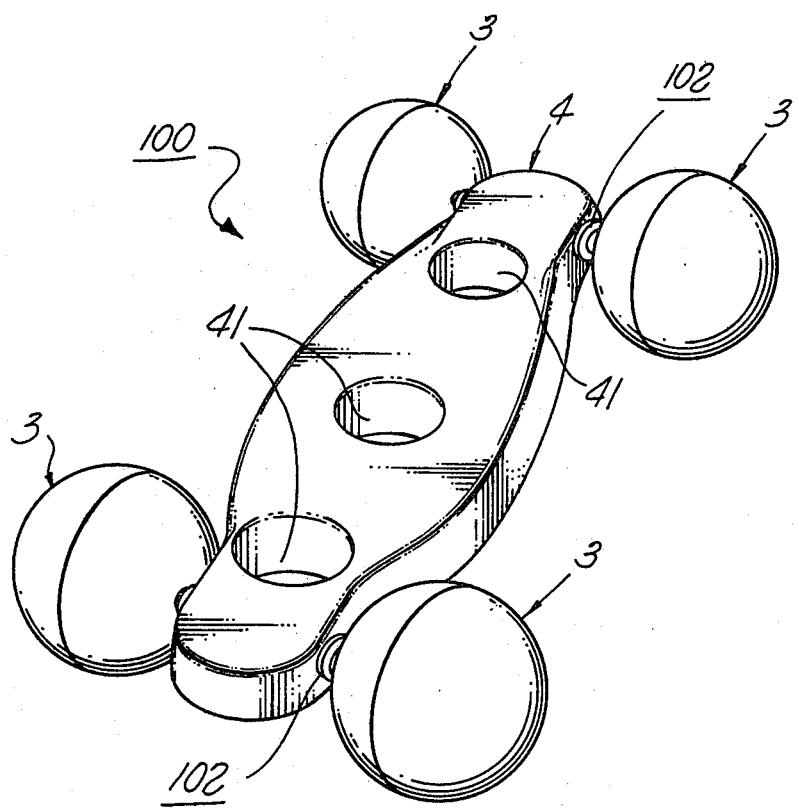
FIG. 2 is a perspective view of the embodiment of the invention illustrated in FIG. 1, with a detachably mounted figurine removed therefrom for clarity.

Referring now to the drawing, and, in particular, to FIGS. 1 and 2 thereof, there is illustrated a preferred embodiment of the present invention generally designated 100. In the embodiment 100, there is provided a body member 4, mounted on four wheels 3 by two axle means 102. The body member 4 may be any desired shape or configuration. In the embodiment 100 there is provided, for example, three apertures 41 therein, in which, for example, a mounting member 5, having a prong 50, which may be detachably retained within one of the apertures 41, together with, for example, a face member 6, which may be mounted on the mounting member 5. The mounting member 5 and face member 6 do not, per se, form a part of the present invention.

Each of the axle means 102 is comprised of a male axle member 1, which fits into a female axle member 2. The body member 4 is provided with walls 40a defining axle member receiving apertures 40 in which the male axle member 1 and female axle member 2 may be inserted, and supported for rotational movement.

Figure 4:
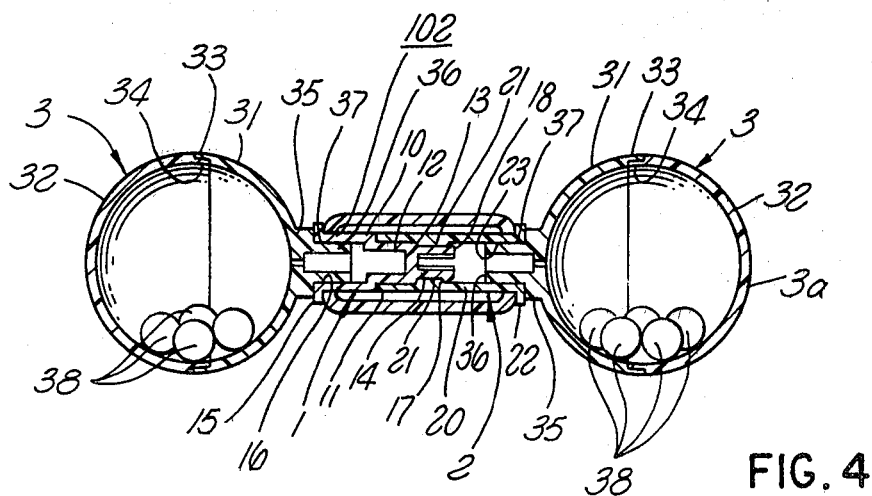
FIG. 4 is a sectional view along the line 4—4 of FIG. 1.
Figures 5, 6:
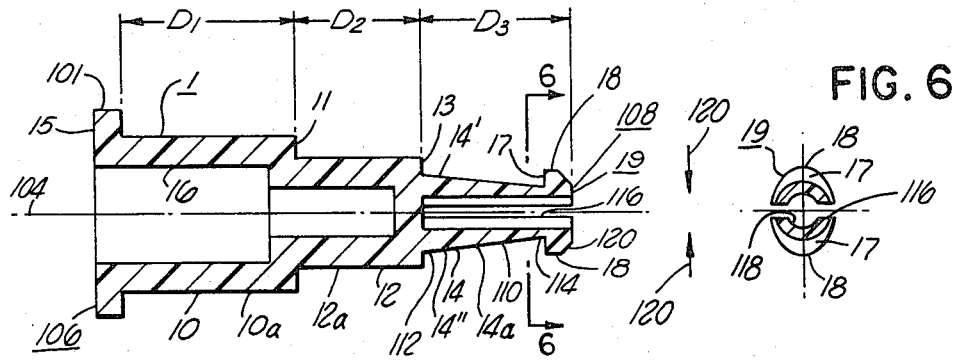
FIG. 5 is a sectional view of a male axle member useful in the practice of the present invention.
FIG. 6 is a sectional view along the line 6—6 of FIG. 5.

As illustrated in greater detail in FIGS. 4, 5, and 6, the male axle member 1 has a male axis 104 and has an outer end 106 and an inner end 108. At the outer end 106 there is provided a male shoulder portion 101, having a preselected outer diameter. A bearing portion 10 is coupled to the male shoulder portion 101, and extends axially therefrom a first preselected distance as indicated by $D_1$ from the outer end 106 toward the inner end 108. The bearing portion 10 has a predetermined outer diameter defining an outer surface 10a and the predetermined outer diameter of the bearing surface 10 is smaller than the predetermined outer diameter of the shoulder portion 37. When inserted in an axle receiving aperture 40 of a body member 4, the walls 40a engage the outer surface 10a for the rotating support of the axle means 107.

A coupling portion 12 is coupled to the bearing portion 10 and extends axially therefrom a second predetermined axial distance indicated at $D_2$ toward the inner end 108. The coupling portion 12 has a predetermined outer diameter defining an outer surface 12a and the predetermined outer diameter of the coupling portion 12 is smaller than the preselected outer diameter of the bearing portion 10 to define an inner bearing portion shoulder 11.

A headed engagement portion 14 is coupled to the coupling portion 12 and extends axially therefrom a third predetermined axial distance as indicated at $D_3$. The headed engagement portion 14 has a shank section 110 having a first end 112 adjacent the coupling portion 12 and a second end 114 spaced axially toward the inner end 108 from the first end 112. The shank section 14 has a preselected diameter at the first end 112 smaller than the preselected diameter of the coupling portion 12 to define a coupling portion shoulder 13. The shank section 101 has an outer surface 14a extending between the first end 112 and the second end 114 thereof.

The headed engagement portion 14 also has a head section 19 coupled to the second end 114 of the shank section and the head section has an engagement part 18, which is provided with an outer dimension greater than the outer diameter of the shank section 110 at the second end 114 thereof, and the outer dimension of the engagement part 18 of the head section 19 is, in embodiment 100, smaller than the predetermined outer diameter of the coupling portion 12.

The head section 19 is radially, resiliently deformable between an engagement condition as illustrated in FIGS. 3, 4, 5, and 6 and an insertion condition as described below in greater detail. The head section 19 has the abutment surface 17 adjacent the shank section 110 for purposes hereinafter described.

In order to provide the radial, resilient deformation, the headed engagement portion 14 is provided with first walls 116, defining a slot extending axially from the inner end 108 to the coupling portion 112. Further, if desired, there may be provided second walls 118 defining a generally circular aperture coaxial with the male axis 104 also extending from the inner end 108 toward the coupling portion 12. In the embodiment 100, the axial aperture defined by the second walls 118 extends from the outer end 108 to the plane containing the shoulder 13. The slot defined by the first walls 116 divide the headed engagement portion 14 into a first part 14' and a second part 14'', which, as described below in greater detail, during insertion into the female axle member 2, the first part 14' and second part 14'' move toward each other as indicated by the arrows 120 to the insertion condition thereof, and then resiliently return to the engagement condition illustrated when the insertion of the male axle member 1 into the female axle member 2 is complete.

In the embodiment illustrated in FIGS. 3, 4, 5, and 6, the head section 19 is generally oval in shape and has a major diameter and a minor diameter, as seen most clearly in FIG. 6. The minor diameter of the oval shaped head section 18 lies in the plane of the slot defined by the first walls 116 and the minor diameter is substantially equal to the diameter of the shank section 110 at the second end 112 thereof. The major diameter of the head section 19 is, of course, larger than the minor diameter to provide the engagement part 18 and the abutment shoulder 17.

To aid in the insertion of the male axle member 1 into the female axle member 2, it has been found to be advantageous to provide a curved or chamfered edge as indicated at 120 on the head section 19.

The shank section 110 of the headed engagement portion 14 of the male axle member 1 is generally frustroconical, having its larger diameter at the first end 112 and its smaller diameter at the second end 114.

Figures 7, 8:
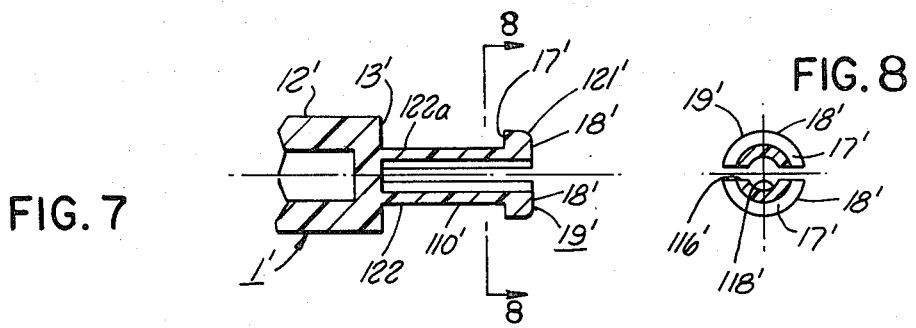
FIG. 7 is a partial sectional view similar to FIG. 5, of another embodiment of a male axle member useful in the practice of the present invention.
FIG. 8 is a sectional view along the line 8—8 of FIG. 7.

FIGS. 7 and 8 illustrate an alternative embodiment generally designated 1' of a male axle member useful in the practice of the present invention. In the embodiment 1' there is provided a headed engagement portion 122, coupled to the coupling portion 112, and the headed engagement portion 122 has a shank section 110' and a head section 19'. The shank section 110' has a substantially constant outer diameter smaller than the outer diameter of the coupling portion 12' and smaller than the outer diameter of the head section 19'. The head section 19' is generally circular in cross-section as is the shank section 110'. The head section 19' may have a rounded portion as indicated at 121' to aid in insertion thereof and is provided with an abutment shoulder 17'. First walls 116' define an axially aligned slot similar to the slot defined by the first walls 116 described above and second walls 118' define a generally circular aperture similar to the circular aperture defined by the second walls 118 described above. The head section 19' is radially deformable in the same manner as the head section 19 described above.

Figure 3:
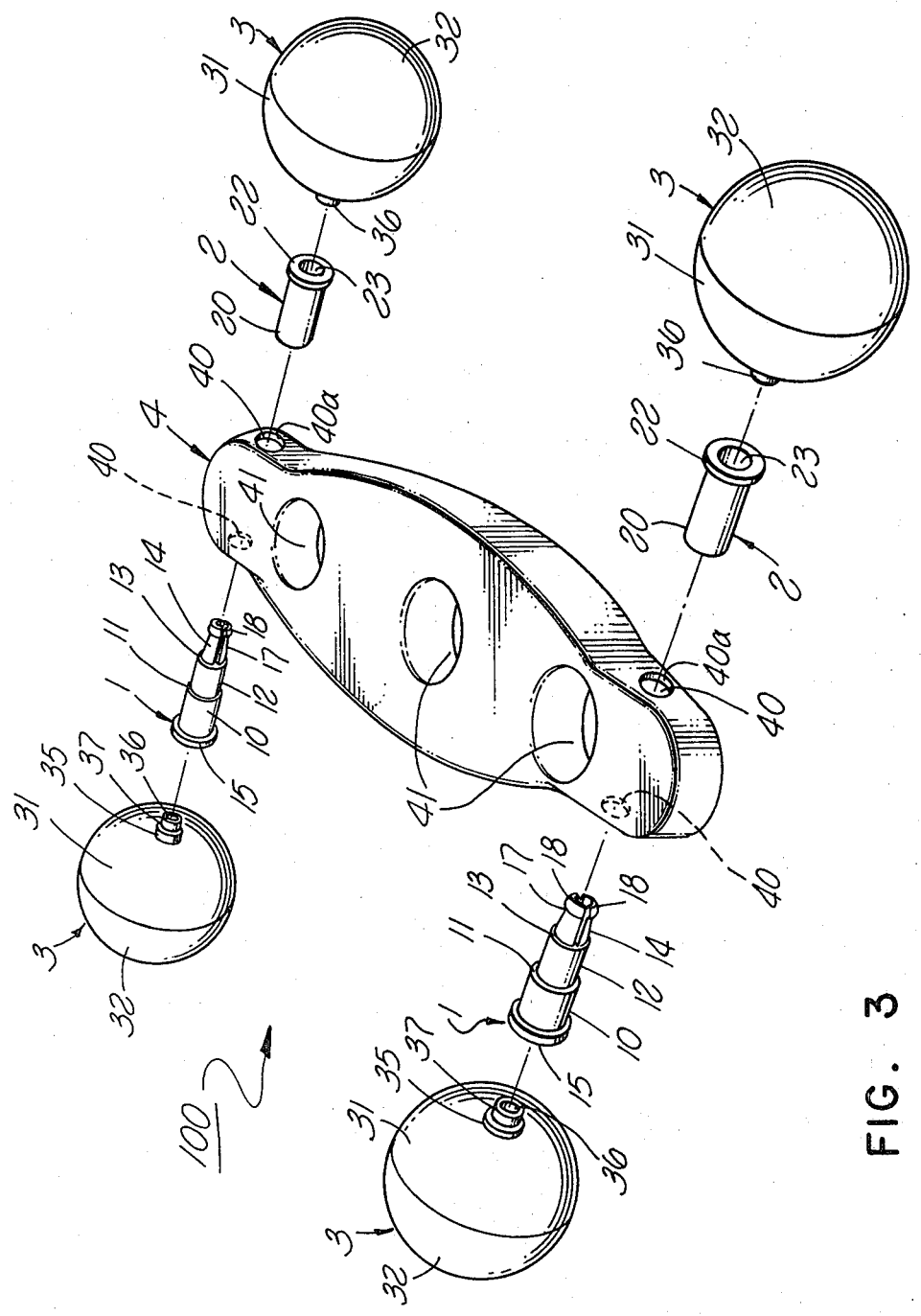
FIG. 3 is an exploded view of the embodiment shown in FIG. 2.
Figure 9:
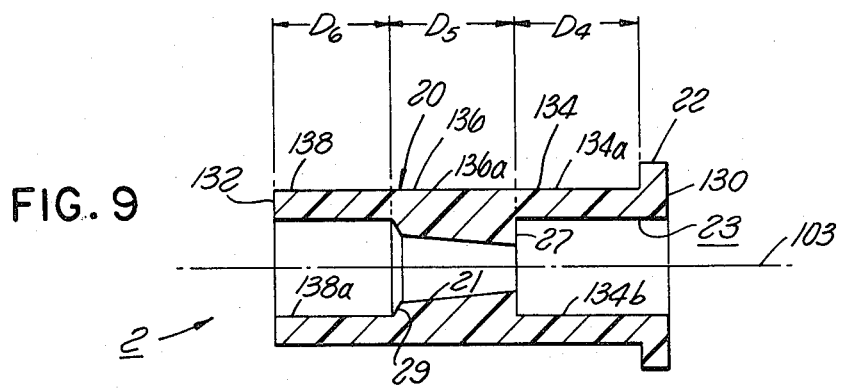
FIG. 9 is a sectional view of a female axle member useful in the practice of the present invention.

As noted above, the axle means 102 also comprises a female axle member 2, as illustrated in FIGS. 3, 4, and 9. The female axle member 2 has a female axis 103 and is provided with a female shoulder portion 22 having a predetermined outer diameter. For example, the outer diameter of the female shoulder portion 22 may be the same as the outer diameter of the male shoulder portion 101 of the male axle member 1 as described above. The female axle member 2 extends from an outer end 130 to an inner end 132. The female axle member 2 has an inner section 20 extending axially from the shoulder portion 22 to the inner end 132. The inner section 20 has a bearing portion 134, coupled to the female shoulder portion 22 and extending axially therefrom a fourth preselected axial distance, as indicated at $D_4$. The bearing portion 134 has a predetermined outer diameter smaller than the preselected outer diameter of the female shoulder portion 22, and the outer diameter of the bearing portion 134 of the female axle member 2 is, in the preferred embodiment of the present invention, substantially the same as the preselected outer diameter of the bearing portion 10 of the male axle member 1. The bearing portion 134 of the female axle member 2 has an outer surface 134a extending the fourth preselected axial distance $D_4$.

The inner section 20 of the female axle member 2 is also provided with a compression portion 136 coupled to the bearing portion 134 and extending axially therefrom a fifth preselected distance as indicated by $D_5$. The compression portion 136 has an outer diameter substantially the same as the outer diameter of the bearing portion 134 in the preferred embodiments of the present invention. The compression portion 136 has an outer surface 136a extending the fifth preselected axial distance $D_5$. The inner portion 20 of the female axle member 2 is also provided with a coupling portion 138, coupled to the compression portion 136 and extending axially therefrom a sixth preselected axial distance as indicated by $D_6$ to the inner end 132. In the preferred embodiments of the present invention, the coupling portion 138 has an outer diameter substantially the same as the outer diameter of the compression portion 136 and bearing portion 134.

The female axle member 2 is also provided with internal walls 23 defining an aperture extending therethrough from the first end 130 to the second end 132. The internal walls 23 define a first internal surface 134b, having a substantially constant diameter and extending from the outer end 130 through the shoulder portion 22 and through the bearing portion 134 to the compression portion 136. The first internal diameter defined by the walls 23 of the female axle member 2 in the female shoulder portion 22 and in regions of the bearing portion 134 adjacent the female shoulder 22 define a boss receiving aperture which, in the preferred embodiment of the present invention, is the same as the diameter of the boss receiving aperture defined by the internal walls 16 in the shoulder portion 101 and bearing portion 10 of the male axle member 1.

The internal walls 23 also define a second internal surface 21 in the compression portion 136 and internal surface 21 has a second internal diameter adjacent the bearing portion 134, smaller than the first internal diameter of the bearing portion 134. Internal surface 21 also has a third internal diameter adjacent the coupling portion 138. In the preferred embodiment of the present invention, as illustrated in detail in FIG. 9, the third internal diameter, adjacent the bearing portion 138 is larger than the second internal diameter adjacent the coupling portion 134, whereby the internal surface 21 defines a frustro-conical surface. As illustrated in detail in FIG. 9, the internal walls 23 also define a first shoulder 27, between the bearing portion 134 and compression portion 136 and a second shoulder 29, which, in the preferred embodiments of the present invention, is chamfered as illustrated between the compression portion 136 and coupling portion 138. The internal walls 23 also define a third internal surface 138a in the coupling portion 138, having a fourth internal diameter greater than the third internal diameter in the compression portion 136.

In the preferred embodiment as illustrated in detail in FIG. 9, the internal surface 138a is a cylindrical surface and the internal surface 134b is also a cylindrical surface. The fourth internal diameter of the coupling portion 138 is selected so that the internal surface 138a provides a frictional fit with a predetermined frictional force with the cylindrical outer surface 12a of the coupling portion 12 of the male axle member 1.

The frustro-conical internal surface 21 of the female axle member 2, in the preferred embodiments of the present invention, matches the frusto-conical outer surface 14a of the male axle member 1.

Figure 10:
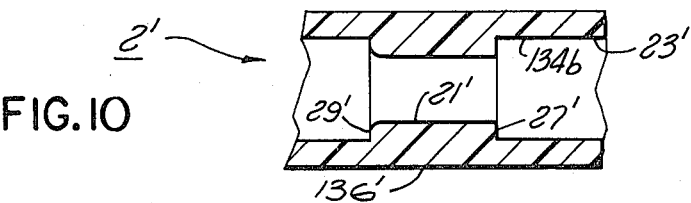
FIG. 10 is a partial, sectional view of another embodiment of a female axle member useful in the practice of the present invention.

FIG. 10 illustrates another embodiment of a female axle member generally designated 2' useful in the practice of the present invention. As illustrated in FIG. 10, the internal walls 23' define a generally cylindrical internal surface 21' in the compression portion 136'. The second shoulder 29' is rounded for purposes as hereinafter described. The female axle member 2' may be utilized, for example, with the male axle member 1' described above.

As illustrated in FIGS. 3 and 4, the present invention is provided with a plurality of wheel means 3. As illustrated, four such wheel means 3 are provided. Each of the wheel means 3 are fabricated in two halves: a first half 31 and a second half 32, joined together as indicated at 33, in an overlapping configuration. They may, for example, when fabricated of plastic, be bonded together to define a smooth outer surface 3a and a smooth internal surface 34. Positioned within the internal surface 34 there may be provided a plurality of beads 38, or similar items, which, when the wheels 3 move, rattle therein to provide an auditory stimulus. The first half 31 of each of the wheel means 3 is provided with a shoulder 35 and a boss 37.

Referring particularly to FIG. 3, the assembly of the above described components may be achieved to provide the improved rolling toy arrangement of the present invention. A male axle member 1 and female axle member 2 are inserted into the oppositely aligned apertures 40 of the body member 4. As the head section 19 of the male axle member 1 engages the second shoulder 29 of the compression portion 136 of the female axle member 2, the headed engagement portion 14 is radially deformed from the engagement condition illustrated in FIG. 5, in the direction of the arrow 120 to the insertion condition, and as the male axle member 1 is pushed further into the compression portion 136, the head section 19 of the male axle member 1 continually engages the internal surface 21 of the compression portion 136 of the female axle member 2, causing further radial deformation thereof until the engagement part 18 of the head section 19 of the male axle member 1 passes beyond the shoulder 27, so that the abutment surface 17 is in engagement therewith. This releases the compression on the headed engagement portion 14 of the male axle member 1 and the headed engagement portion 14 of the male axle member 1 resiliently returns to the engagement condition thereof, with the head section 18 positioned in bearing portion 134 of the female axle member 2. The mutual engagement of the engagement part 18 with the shoulder 27 prevents withdrawal of the male axle member 1 from the female axle member 2. The configuration of the frustro-conical surface 21 of the compression portion 136 of the female axle member 2 may be selected to provide a predetermined amount of radial compression on the headed engagement portion 14 of the male axle member 1 when in the engagement condition as illustrated in FIG. 4, or, alternatively, may be sized to provide that there is substantially no radial compression. In the preferred embodiments of the present invention, the second axial length $D_2$ of the coupling portion 12 is selected to be substantially the same as the sixth axial distance $D_6$ of the coupling portion 138 of the female axle member 2, so that the inner end 132 of the female axle member 2 abuts against the shoulder 11 of the male axle member 1 in the engagement condition as illustrated in FIG. 4. Further, in the preferred embodiments of the present invention, the shoulder 13 of the male axle member 1 abuts against the shoulder 29 of the female axle member 2 in the engaged condition, as shown in FIG. 4. Wheel means 3 are then inserted into the axle means 102. The boss 37 is inserted into the male axle member 1 from the first end 106, extends through the male shoulder 101 into the bearing portion 10 a predetermined axial distance. The outer surface of the boss 37 is in engagement with the internal surface 16 of the male axle member 1.

Similarly, a boss 37 of a wheel means 3 is inserted into the aperture defined by the internal walls 23 of the female axle member 2, and extends through the female shoulder 22 into the bearing portion 134 a predetermined axial distance, with the external surface of the boss 37 in engagement with the internal surface 134b.

In order to enhance the play value of the toy vehicle as described above, it is preferred that each of the wheel means three be independently rotatable. Thus, for example, if desired, the wheel means 3 may be bonded or otherwise fixedly coupled to the axle 102 and independent rotary motion of each pair of wheel means 3 inserted into an axle means 102 may be achieved by relative rotary motion of the male axle member 1 with respect to the desired degree of ease of such relative rotary motion. Alternatively, if desired, the male axle member 1 may be bonded or otherwise fixedly coupled to the female axle member 2 and the relative rotary motion of the wheels 3 may be provided by the engagement of the outer surfaces of the boss 37 of each wheel means 3 with the corresponding surfaces of the axle means 102 with which they are in engagement.

Alternatively, there may be no bonding between the male axle member 1 and female axle member 2 of axle means 102, and no bonding of a wheel 3 into an axle means 102. In such an embodiment, the male axle member 1 is retained by the above described engagement of the engagement part 18 of the male axle member 1 with the shoulder 27 of the female axle member 2, and the wheel means 3 may be pulled out of engagement with the axle means 102 and may be utilized as, for example, a conventional rattle. The diameters of the various components are selected to provide any degree of frictional engagement therebetween to allow, for example, the above described removal of the wheel means 3 from the axle means 102 in such an embodiment.

In preferred embodiments of the present invention, the male axle member 1 is unitarily fabricated, for example, by molding, and the female axle member 2 is unitarily fabricated, for example, by molding, and both may be molded from plastic or any other desired material.

The apertures 40 in the body member 4 provide a bearing surface for rotary motion of the axle means 102 by engagement with the respective bearing portions 10 and 134 of the male and female axle members 1 and 2. It will be appreciated that while the body means 4 is illustrated, as shown in FIG. 4, as comprised of a hollow construction, a solid body means 4 may equally well be utilized in other embodiments of the present invention. The axle means 102 is equally adaptable to either a hollow or solid body means.

When the present invention is assembled as described above, as illustrated in FIGS. 1 and 3, an improved roll toy is provided which has independently rotatable wheels as well as providing an auditory stimulus when the wheels are moved.

Having thus described an improved roll toy arrangement according to the present invention, those skilled in the art may find many variations and adaptations thereof, and all such variations and adaptations falling within the true scope and spirit of the present invention are intended to be covered by the appended claims.

What is claimed is:

1. A male axle member, having a predetermined male axis and comprising, in combination:
    a male shoulder portion having a preselected outer diameter;
    a bearing portion coupled to said male shoulder portion and extending axially therefrom a first predetermined axial distance and having a predetermined outer diameter defining an outer surface and smaller than said preselected outer diameter of said male shoulder portion;
    a coupling portion coupled to said bearing portion and extending axially therefrom a second predetermined axial distance and having a predetermined outer diameter defining an outer surface and smaller than said preselected outer diameter of said bearing portion; and
    a headed engagement portion coupled to said coupling portion and extending axially therefrom a third predetermined axial distance, and said headed engagement portion having:
        a shank section having a first end adjacent said coupling portion and a second end spaced axially from said first end, and said shank section having a predetermined outer diameter at said first end smaller than said predetermined outer diameter of said coupling portion, and having an outer surface extending between said first end and said second end; and
        a head section coupled to said second end of said shank section and said head section having at least an engagement part thereof having an outer diameter larger than the outer diameter of said shank section at said second end thereof and smaller than said predetermined outer diameter of said coupling portion; and
        said head section radially resiliently deformable between an engagement condition and an insertion condition.

2. The arrangement defined in claim 1, wherein:
    said head section of said headed engagement portion has a generally oval cross section and said engagement part thereof is along the major axis of the oval.

3. The arrangement defined in claim 2, wherein:
    said engagement part of said head section has a minor diameter substantially equal to the outer diameter of said shank section at said second end.

4. The arrangement defined in claim 1, 2 or 3, wherein said headed engagement portion further comprises:
    first walls defining a slot extending through said head section and from said second end of said shank section toward said first end of said shank section to provide said resilient radial deformation of said head section.

5. The arrangement defined in claim 1, 2, or 3, wherein said outer surface of said shank section of said headed engagement portion is frustro-conical, having a larger diameter at said first end and a smaller diameter at said second end.

6. The arrangement defined in claim 5, wherein said headed engagement portion further comprises:
    second walls defining an aperture therein having a generally circular cross-section and extending substantially co-extensively with said slot.

7. The arrangement defined in claim 6, wherein:
said male shoulder portion and said bearing portion have internal walls defining an axially extending boss receiving aperture therein, and said boss receiving aperture having a predetermined axial extent and a diameter smaller than said preselected outer diameter of said male shoulder portion and said predetermined outer diameter of said bearing portion.

8. The arrangement defined in claim 7, wherein said male shoulder portion, said bearing portion, said coupling portion, and said headed engagement portion are coaxially aligned along said male axis.

9. The arrangement defined in claim 8, wherein said slot in said headed engagement portion lies in the plane defined by said male axis and said minor diameter of said oval shaped head section.

10. The arrangement defined in claim 9, wherein said aperture in said headed engagement portion is coaxial with said male axis.

11. The arrangement defined in claim 1, wherein said head section is substantially circular in cross-section.

12. The arrangement defined in claim 11, wherein said headed engagement portion further comprises:
first walls defining a slot extending through said head section and from said second end of said shank section toward said first end of said shank section to provide said resilient radial deformation of said head section.

13. The arrangement defined in claim 11, wherein said outer surface of said shank section of said headed engagement portion is frusto-conical, having a larger diameter at said first end and a smaller diameter at said second end.

14. The arrangement defined in claim 12, wherein said headed engagement portion further comprises:
second walls defining an aperture therein having a generally circular cross-section and extending substantially co-extensively with said slot.

15. The arrangement defined in claim 11 or 14, wherein:
said male shoulder portion and said bearing portion have internal walls defining an axially extending boss receiving aperture therein, and said boss receiving aperture having a predetermined axial extent and a diameter smaller than said preselected diameter of said male shoulder portion and said predetermined outer diameter of said bearing portion.

16. The arrangement defined in claim 11 or 14, wherein said male shoulder portion, said bearing portion, said coupling portion, and said headed engagement portion are coaxially aligned along said male axis.

17. The arrangement defined in claim 16, wherein said aperture in said headed engagement portion is coaxial with said male axis.

18. A female axle member, having a predetermined female axis, and comprising, in combination:
a female shoulder portion having a preselected outer diameter;
a bearing portion coupled to said female shoulder portion, and extending axially therefrom a fourth predetermined axial distance, and having a predetermined outer diameter smaller than said preselected outer diameter of said female shoulder portion;
a compression portion coupled to said bearing portion and extending axially therefrom a fifth preselected axial distance, and having an outer diameter substantially the same as said outer diameter of said bearing portion;
a coupling portion, coupled to said compression portion, and extending axially therefrom a sixth predetermined distance and having an outer diameter substantially the same as said outer diameter of said bearing portions;
and
said female axle member having internal walls defining an internal aperture therethrough from said female shoulder portion to said coupling portion thereof, and said internal walls defining
a first internal surface in said shoulder portion and said bearing portion extending a preselected axial distance to define a boss receiving aperture having a first predetermined internal diameter;
a second internal surface in said compression portion having a second internal diameter adjacent said bearing portion and said second internal diameter smaller than said first internal diameter, and a third internal diameter in said compression portion adjacent said coupling portion; and
said second internal surface defining a first shoulder at said bearing portion and a second shoulder at said coupling portion;
a third internal surface in said coupling portion having a fourth internal diameter adjacent said compression portion greater than said third internal diameter.

19. The arrangement defined in claim 18, wherein:
said second internal surface of said compression portion is frusto-conical, and said second internal diameter adjacent said bearing portion is smaller than said third internal diameter adjacent said coupling portion.

20. The arrangement defined in claim 18 or 19, wherein said second shoulder of said compression portion adjacent said coupling portion is tapered.

21. The arrangement defined in claim 18, wherein said second and third internal diameters of said compression portion are substantially the same and smaller than said first internal diameter of said bearing portion and said fourth internal diameter of said coupling portion and said second internal surface is cylindrical.

22. The arrangement defined in claim 21, wherein said second shoulder of said compression portion at said coupling portion is rounded.

23. An axle means for a toy vehicle, comprising, in combination:
a female axle member having a predetermined female axis, and said female axle member comprising:
a female shoulder portion having a preselected outer diameter;
a bearing portion coupled to said female shoulder portion, and extending axially therefrom a fourth predetermined axial distance, and having a predetermined outer diameter smaller than said preselected outer diameter of said female shoulder portion;
a compression portion coupled to said bearing portion and extending axially therefrom a fifth preselected axial distance, and having an outer diameter substantially the same as said outer diameter of said bearing portion;
a coupling portion, coupled to said compression portion, and extending axially therefrom a sixth predetermined distance and having an outer diameter substantially the same as said outer diameter of said bearing portion;

and said female axle member having internal walls defining an internal aperture therethrough from said female shoulder portion to said coupling portion thereof, and said internal walls defining
- a first internal surface in said shoulder portion and said bearing portion extending a preselected axial distance to define a boss receiving aperture having a first predetermined internal diameter;
- a second internal surface in said compression portion having a second internal diameter adjacent said bearing portion and said second internal diameter smaller than said first internal diameter, and a third internal diameter in said compression portion adjacent said coupling portion; and
- said second internal surface defining a first shoulder at said bearing portion and a second shoulder at said coupling portion;
- a third internal surface in said coupling portion having a fourth internal diameter adjacent said compression portion greater than said third internal diameter;

a male axle member having a predetermined male axis and positioned within said aperture of said female axle member and said female axis and said male axis colinear, and said male axle member comprising:
- a male shoulder portion having a preselected outer diameter;
- a bearing portion coupled to said male shoulder portion and extending axially therefrom a first predetermined axial distance and having a predetermined outer diameter defining an outer surface and smaller than said preselected outer diameter of said male shoulder portion;
- a coupling portion coupled to said bearing portion and extending axially therefrom a second predetermined axial distance and having a predetermined outer diameter defining an outer surface and smaller than said preselected outer diameter of said bearing portion; and
- a headed engagement portion coupled to said coupling portion and extending axially therefrom a third predetermined axial distance, and said headed engagement portion having:
  - a shank section having a first end adjacent said coupling portion and a second end spaced axially from said first end, and said shank section having a predetermined outer diameter at said first end smaller than said predetermined outer diameter of said coupling portion, and having an outer surface extending between said first end and said second end; and
  - a head section coupled to said second end of said shank section and said head section having at least an engagement part thereof having an outer diameter larger than the outer diameter of said shank section at said second end thereof and smaller than said predetermined outer diameter of said coupling portion; and
  - said head section radially resiliently deformable between an engagement condition and an insertion condition, and
  - said head section of said headed engagement portion of said male axle member positioned within said internal surface of said bearing portion of said female axle member, and said outer dimension of said engagement part of said head section of said headed engagement portion of said male axle member larger than said second internal diameter of said compression portion of said female axle member in said engagement condition thereof; and
  - said internal surface of said compression portion of said female axle member engaging said outer surface of said shank section of the headed engagement portion of said male axle member; and
  - said internal surface of said coupling portion of said female axle member engaging said outer surface of said coupling portion of said male axle member.

24. The arrangement defined in claim 23, wherein said outer diameter of said bearing portion of said male axle member is substantially equal to said outer diameter of said bearing portion of said female axle member.

25. The arrangement defined in claim 24, wherein said second predetermined axial distance of said coupling portion of said male axle member is substantially equal to said sixth predetermined axial distance of said coupling portion of said female axle member.

26. The arrangement defined in claim 25, wherein said axial spacing between said first end and said second end of said shank section of said headed engagement portion of said male axle member is substantially equal to the axial length of said compression portion of said female axle member.

27. The arrangement defined in claim 26, wherein:
said head section of said headed engagement portion is generally oval in shape and said engagement part thereof is along the major axis of the oval shape.

28. The arrangement defined in claim 27, wherein:
said engagement part of said head section has a minor diameter substantially equal to the outer diameter of said shank section at said second end.

29. The arrangement defined in claim 28, wherein said headed engagement portion further comprises:
first walls defining a slot extending through said head section and from said second end of said shank section toward said first end of said shank section to provide said resilient radial deformation of said head section, whereby said headed engagement portion is radially deformed to its insertion condition for the condition of said head section of said headed engagement portion of said male axle member being positioned within said compression portion of said female axle member.

30. The arrangement defined in claim 29, wherein said outer surface of said shank section of said headed engagement portion is frusto-conical, having a larger diameter at said first end and a smaller diameter at said second end, and said third internal diameter of said compression portion of said female axle member is substantially equal to said larger diameter of said shank section of said headed engagement portion of said male axle member and said second internal diameter of said compression portion of said female axle member is substantially equal to said smaller diameter of said shank section of said headed engagement portion of said male axle member.

31. The arrangement defined in claim 30, wherein said headed engagement portion further comprises:
second walls defining an aperture therein having a generally circular cross-section and extending substantially co-extensively with said slot.

32. The arrangement defined in claim 30, wherein said slot in said headed engagement portion lies in the plane defined by said male axis and said minor diameter of said oval shaped head section.

33. The arrangement defined in claim 32, wherein said aperture in said headed engagement portion is coaxial with said male axis.

34. The arrangement defined in claim 33, wherein:
said male shoulder portion and said bearing portion have internal walls defining an axially extending boss receiving aperture therein, and said boss receiving aperture having a predetermined axial extent and a diameter smaller than said predetermined diameter of said male shoulder portion and said bearing portion.

35. The arrangement defined in claim 34, wherein said outer diameter of said bearing portion, said compression portion, and said coupling portion of said female axle member, is substantially equal to said outer diameter of said bearing portion of said male axle member.

36. An improved roll toy vehicle comprising, in combination:
a body member having a pair of axle means receiving apertures therethrough;
an axle means positioned within each of said pair of axle receiving apertures of said body member and each of said axle means comprising:
a female axle member having a predetermined female axis, and said female axle member comprising:
a female shoulder portion having a preselected outer diameter;
a bearing portion coupled to said female shoulder portion, and extending axially therefrom a fourth predetermined axial distance, and having a predetermined outer diameter smaller than said preselected outer diameter of said female shoulder portion;
a compression portion coupled to said bearing portion and extending axially therefrom a fifth preselected axial distance, and having an outer diameter substantially the same as said outer diameter of said bearing portion;
a coupling portion, coupled to said compression portion, and extending axially therefrom a sixth predetermined distance and having an outer diameter substantially the same as said outer diameter of said bearing portion;
and
said female axle member having internal walls defining an internal aperture therethrough from said female shoulder portion to said coupling portion thereof, and said internal walls defining
a first internal surface in said shoulder portion and said bearing portion extending a preselected axial distance to define a boss receiving aperture having a first predetermined internal diameter;
a second internal surface in said compression portion having a second internal diameter adjacent said bearing portion and said second internal diameter smaller than said first internal diameter, and a third internal diameter in said compression portion adjacent said coupling portion; and
said second internal surface defining a first shoulder at said bearing portion and a second shoulder at said coupling portion;
a third internal surface in said coupling portion having a fourth internal diameter adjacent said compression portion greater than said third internal diameter;

a male axle member having a predetermined male axis and positioned within said aperture of said female axle member and said female axis and said male axis colinear, and said male axle member comprising:
a male shoulder portion having a preselected outer diameter;
a bearing portion coupled to said male shoulder portion and extending axially therefrom a first predetermined axial distance and having a predetermined outer diameter defining an outer surface and smaller than said preselected outer diameter of said male shoulder portion;
a coupling portion coupled to said bearing portion and extending axially therefrom a second predetermined axial distance and having a predetermined outer diameter defining an outer surface and smaller than said predetermined outer diameter of said bearing portion; and
a headed engagement portion coupled to said coupling portion and extending axially therefrom a third predetermined axial distance, and said headed engagement portion having:
a shank section having a first end adjacent said coupling portion and a second end spaced axially from said first end, and said shank section having a predetermined outer diameter at said first end smaller than said predetermined outer diameter of said coupling portion, and having an outer surface extending between said first end and said second end; and
a head section coupled to said second end of said shank section and said head section having at least an engagement part thereof having an outer diameter larger than the outer diameter of said shank section at said second end thereof and smaller than said predetermined outer diameter of said coupling portion; and
said head section radially resiliently deformable between an engagement condition and an insertion condition, and said head section of said headed engagement portion of said male axle member positioned within said internal surface of said bearing portion of said female axle member, and said outer dimension of said engagement part of said head section of said headed engagement portion of said male axle member larger than said second internal diameter of said compression portion of said female axle member in said engagement condition thereof;
said internal surface of said compression portion of said female axle member engaging said outer surface of said shank section of the headed engagement portion of said male axle member;
said internal surface of said coupling portion of said female axle member engaging said outer surface of said coupling portion of said male axle member;
said male shoulder portions and said male bearing portion have internal walls defining an axially extending boss receiving aperture therein, and said boss receiving aperture having a predetermined axial extent and a diameter smaller than said predetermined diameter of said male should portion and said bearing portion; and
a pair of wheel means mounted in each of said pair of axle means and each of said wheel means having a body portion, a shoulder portion coupled to the body portion, and having a predetermined outer diameter larger than said axle receiving apertures in said body member, and a boss extending outwardly from said shoulder portion and said boss having an outer diameter for a predetermined frictional engagement with said boss receiving apertures of said male axle member and said female axle member.

37. The arrangement defined in claim 36, wherein said outer diameter of said bearing portion of said male axle member is substantially equal to said outer diameter of said bearing portion of said female axle member.

38. The arrangement defined in claim 37, wherein said second predetermined axial distance of said coupling portion of said male axle member is substantially equal to said sixth predetermined axial distance of said coupling portion of said female axle member.

39. The arrangement defined in claim 38, wherein said axial spacing between said first end and said second end of said shank section of said headed engagement portion of said male axle member is substantially equal to the axial length of said compression portion of said female axle member.

40. The arrangement defined in claim 39, wherein:
said head section of said headed engagement portion is generally oval in shape and said engagement part thereof is along the major axis of the oval shape.

41. The arrangement defined in claim 40, wherein:
said head section has a minor diameter substantially equal to the outer diameter of said shank section at said second end.

42. The arrangement defined in claim 41, wherein said headed engagement portion further comprises:
first walls defining a slot extending through said head section and from said second end of said shank section toward said first end of said shank section to provide said resilient radial deformation of said head section, whereby said headed engagement portion is radially deformed to its insertion condition for the condition of said head section of said headed engagement portion of said male axle member being positioned within said compression portion of said female axle member.

43. The arrangement defined in claim 42, wherein said outer surface of said shank section of said headed engagement portion is frusto-conical, having a larger diameter at said first end and a smaller diameter at said second end, and said third internal diameter of said compression portion of said female axle member is substantially equal to said larger diameter of said shank section of said headed engagement portion of said male axle member and said second internal diameter of said compression portion of said female axle member is substantially equal to said smaller diameter of said shank section of said headed engagement portion of said male axle member.

44. The arrangement defined in claim 43, wherein said headed engagement portion further comprises:
second walls defining an aperture therein having a generally circular cross-section and extending substantially co-extensively with said slot.

45. The arrangement defined in claim 44, wherein said slot in said headed engagement portion lies in the plane defined by said male axis and said minor diameter of said oval shaped head section.

46. The arrangement defined in claim 45, wherein said aperture in said headed engagement portion is co-axial with said male axis.

47. The arrangement defined in claim 46, wherein said outer diameter of said bearing portion, said compression portion, and said coupling portion of said female axle member, is substantially equal to said outer diameter of said bearing portion of said male axle member.

48. The arrangement defined in claim 36, wherein said wheel means have walls defining an internal cavity, and a plurality of bead like means within said cavity defined by said wheel means, whereby said bead like members produce an auditory sound for the condition of movement of said wheel means.

49. The arrangement defined in claim 36, wherein said wheel means are fixedly coupled to the respective male axle member and female axle member in which they are mounted, and said male axle members rotate relative to said female axle members.

50. The arrangement defined in claim 36, wherein said female axle members are fixedly coupled to said male axle members and said wheel means are frictionally retained within said axle means for relative rotational movement with respect to each other.

51. The arrangement defined in claim 50, wherein said wheel means have a predetermined frictional fit with said axle means to allow selective removal of said wheel means from said axle means.

* * * * *